United States Patent [19]

Shieh

[11] Patent Number: 4,677,353

[45] Date of Patent: Jun. 30, 1987

[54] ELECTRO-INDUCTIVE VIBRATORY MONITORING SYSTEM

[75] Inventor: Ming K. Shieh, Simpsonville, S.C.

[73] Assignee: Dresser Industries, Inc., Dallas, Tex.

[21] Appl. No.: 810,764

[22] Filed: Dec. 19, 1985

Related U.S. Application Data

[63] Continuation-in-part of Ser. No. 536,405, Sep. 27, 1983, abandoned.

[51] Int. Cl.$^4$ .............................................. H02K 33/00
[52] U.S. Cl. .................................. 318/128; 318/130; 310/29
[58] Field of Search .................. 310/28, 29, 27, 75; 318/114–133

[56] References Cited

U.S. PATENT DOCUMENTS

| | | | |
|---|---|---|---|
| 2,273,912 | 2/1942 | Doyle | 172/240 |
| 2,287,406 | 6/1942 | Baird | 172/240 |
| 3,128,911 | 4/1964 | Morris et al. | 222/52 |
| 3,142,011 | 7/1964 | Shieh | 318/133 |
| 3,400,316 | 9/1968 | Kuschel | 318/114 |
| 3,434,586 | 3/1969 | Morris | 198/220 |
| 3,447,051 | 5/1969 | Attwood et al. | 318/127 |
| 3,477,281 | 11/1969 | Helmuth | 73/71.6 |
| 3,654,540 | 4/1972 | Honig et al. | 318/118 |
| 3,748,553 | 7/1973 | Reiner | 310/274 |
| 3,908,138 | 9/1975 | Shieh | 310/29 |
| 3,930,174 | 12/1975 | Shieh | 310/29 |
| 4,049,997 | 9/1977 | McGhee | 318/128 |
| 4,216,416 | 8/1980 | Grace | 318/128 |
| 4,303,870 | 12/1981 | Nakamura et al. | 318/130 |

FOREIGN PATENT DOCUMENTS 2086003 5/1982 United Kingdom .

Primary Examiner—Donovan F. Duggan

[57] ABSTRACT

A method of and apparatus for measuring the vibration amplitude of an electromagnetic vibratory motor is disclosed in which the current induced in the coils of the motor is rectified and sensed and applied to a current signal conditioning circuit to produce an average current signal. The voltage across the coils is sensed and is applied to a voltage signal conditioning circuit to produce a peak voltage signal. First and second predetermined scale factor signals are generated. The average current signal is divided by the peak voltage signal and the result is multiplied by the second scale factor signal. The scaled divided signal is subtracted from the first scale factor signal to yield the desired signal representative of the vibration amplitude of the vibratory motor.

12 Claims, 2 Drawing Figures

ELECTRO-INDUCTIVE VIBRATORY MONITORING SYSTEM

CROSS-REFERENCES TO RELATED APPLICATIONS

This application is a continuation-in-part of application Ser. No. 536,405 filed Sept. 27, 1983 now abandoned.

The subject matter of this application is also related to a copending application, Ser. No. 802,673, entitled "REACTIVE POSITION DETECTOR FOR ELECTROMAGNETIC VIBRATORS" which is a continuation-in-part of application Ser. No. 536,402 filed Sept. 27, 1983, which related applications are assigned to the same assignee of this application. The disclosures of said applications are incorporated herein by reference.

BACKGROUND OF THE INVENTION

The present invention relates to systems for controlling vibratory motors. More specifically, the present invention is directed to a method of and apparatus for monitoring the vibration amplitude of a vibratory feeder system by measuring the current and voltage utilized by the vibratory motor.

The vibratory feeders with which the present invention is to be used are well known in the art. In a typical construction of such a vibratory feeder, an electromagnetic vibrating motor is utilized in conjunction with a feed trough. The mass to be transported, such as coal or other bulky material, is moved along the feed trough by the action of the vibratory motor. Such electromagnetic vibrators suitable for use with this invention are described in commonly assigned U.S. Pat. Nos. 3,908,138 and 3,930,174, the disclosures of which are hereby incorporated by reference.

In order to control the action of a vibratory feeder, it is necessary to monitor and control the vibration and amplitude of the motor driving the feeder. Such monitoring and control results in a uniform capacity carried by the feeder and prevents overstroke of the electromagnetic vibrator itself. Such overstroke can cause self-destruction of the electromagnetic feeder.

As is well known, such vibratory feeders usually operate on the principle of resonance. By utilizing judicious design procedures, the mass M and spring rate K of the feeder are so proportioned that the resonant frequency of the vibratory feeder is close to its excitation frequency. This produces the minimum power requirement to operate the feeder.

However, during operation, both M and K may change. For example, the mass M might increase because of build-up of material on the deck of the feeder or the spring rate K might decrease because of higher environmental temperature conditions. These changes in M and K will result in a shifting of the system resonant frequency, thus causing an irregular or varying vibration amplitude.

Another source of irregularity may come from the line voltage, the fluctuation of which will vary vibration amplitude.

Heretofore, a motion transducer, such as an accelerometer or velocity pick-up, was installed on the vibration deck in order to aid in stabilizing the vibration amplitude. The transducer was connected by a cable to the controller of a regulatory feedback loop system. Such a feedback system is disclosed in U.S. Pat. No. 2,273,912. By monitoring the resonant frequency of the vibratory feeder, the vibration amplitude of the feeder could be modified to compensate for the changes in mass M and spring rate K. However, such an approach created substantial maintenance problems in that the environment surrounding the transducer was frequently filled with dust particles and other, larger solid particles. In addition, the constantly vibrating environment created additional instrumentation problems. Furthermore, the initial cost of the motion transducer and cable and the cost of maintaining both in proper operating condition in such a harsh environment was substantial.

Another prior art approach is to vary the frequency of vibration, as well as the vibratory current, in a closed loop control system, to regulate the amplitude of vibration, for instance, as shown in U.S. Pat. Nos. 3,447,051 and 3,748,583. However, it is likely to be costly to build and maintain such a complex system, especially relating to a large power vibrator where the need often arises to convey tens of thousands of tons of bulk materials per day.

SUMMARY AND OBJECTS OF THE INVENTION

In view of the foregoing, it should be apparent that there still exists a need in the art for a method of and apparatus for monitoring and regulating the vibration amplitude of a vibratory feeder in which the limitations caused by the harsh environment of use of such feeders are avoided. It is, therefore, a primary object of this invention to provide a method of and apparatus for monitoring and controlling an electromagnetic vibratory feeder which utilizes the voltage and current supplied to the vibratory motor of the feeder to establish a vibration signal representative of the vibration amplitude.

More particularly, it is an object of this invention to provide monitoring apparatus as aforementioned having simple and reliable electronic circuitry which does not require frequent maintenance nor costly components.

Still more particularly, it is an object of this invention to provide monitoring apparatus for monitoring the vibration amplitude of an electromagnetic vibratory feeder which is characterized by simple electronic circuitry and is not subject to the harsh operating environment in which such vibratory feeders are used.

Still more particularly, it is an object of this invention to provide mathematical guidance for building such monitoring apparatus.

Briefly described, these and other objects of the invention are accomplished by providing apparatus which rectifies and senses the induced current in the coils of the vibratory motor. The sensed current is then supplied to a current signal conditioning circuit which provides an output signal isolated from the high voltage applied to the vibratory motor and which represents the average current induced in the coils.

The voltage across the coils is also sensed and is supplied to a voltage signal conditioning circuit which provides an output signal also isolated from the high voltage applied to the vibratory motor and which represent the peak value of the 60 Hz component of the voltage across the coils.

The average current signal is supplied to a first scale factor generating circuit where a first predetermined scale factor $K_1$ is computed. The peak voltage value signal is supplied to a dividing circuit, as is the average current signal. The dividing circuit divides the average current signal $I_{dc}$ by the peak voltage value signal $V_m$. In addition, a second predetermined scale factor $K_2$ is generated by the divider circuit and is used to scale the divider signal $I_{dc}/V_m$ to a value of $K_2 I_{dc}/V_m$. This scaled divided signal is supplied to a subtractor, to which the first scaled signal $K_1$ is also supplied. The subtractor subtracts the scaled divided signal from the first scaled signal to produce the desired vibration amplitude signal which may then be used to control the operation of the vibratory motor and hence the vibratory feeder.

DETAILED DESCRIPTION OF THE PREFERRED EMBODIMENT

Figure 1:
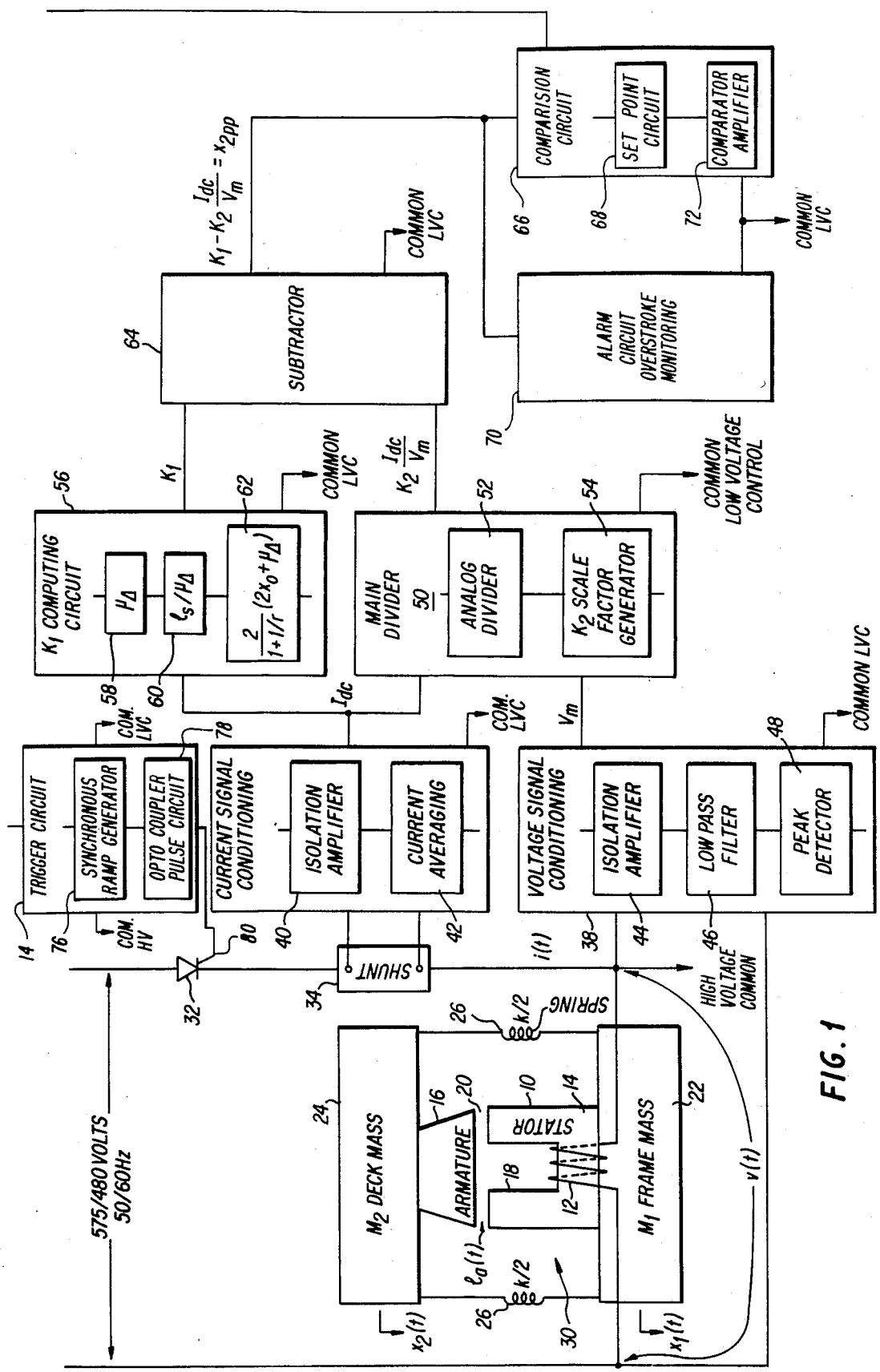
FIG. 1 is a system block diagram of the present invention showing the derivation of the electromechanical equations applicable to the present invention.

Referring now in detail to the drawings wherein like parts are designated by like reference numerals throughout, there is schematically illustrated in FIG. 1 an electromagnetic vibratory motor 30 comprising a U-shaped stator 10 having a series of turns of wire comprising a coil or coils 12 wound about its base or iron path 14. Alternatively, the wire may be wound about each leg, forming two coils. An armature 16 is spaced from the top of the legs 18 of the stator 10 by an air gap 20.

The electromagnetic vibratory motor 30, which is comprised primarily of the stator 10, coil 12, armature 16 and air gap 20, is resiliently mounted between the frame 22 and the deck 24 of, for example, a typical vibratory feeding trough, such as a trough manufactured by the Jeffrey Manufacturing Division of Dresser Industries, Inc., Woodruff, S.C. 29388. The mass of each of the frame 22 and deck 24 can be represented by $M_1$ and $M_2$, respectively. A spring 26 having a spring constant K completes the electromechanical representation of a typical electromagnetic vibratory motor installation. The spring 26 is shown divided in half for illustrative purposes. Thus, each spring 26 as shown has a spring constant of K/2.

The vibratory motor 30 is connected to a source of electrical energy, for instance 575 or 480 volts, 50 or 60 Hz, through a diode or SCR 32. One side of the coil 12 is connected to the cathode of the SCR or diode 32 through a resistor 34 and the other side of the coil 12 is connected to one side of the power source. The anode of the diode or SCR is connected to the other side of the power source. Thus, when the diode or SCR 32 conducts current, the electromagnetic vibratory motor 30 is caused to vibrate or oscillate at a determinable rate, and at the line frequency.

When this occurs, the frame 22 will vibrate at a rate $X_1(t)$ and the deck 24 will be vibrating at a rate $X_2(t)$. Assuming the inductance of the coil 12 is large, and the resistance of the coil is small, the voltage across the coil 12 will be equal to the line voltage or $V(t)$, and the current through the coil 12 will be equal to $i(t)$. In order to obtain the desired result, i.e., the peak-to-peak vibration amplitude $X_{2pp}$ of the deck 24, the expression $X_{2pp} = K_1 - K_2 I_{dc}/V_m$ must be obtained. This expression is derived from simultaneously solving the following electromechanical differential equations:

$$M_1(d^2X_1/dt^2) + K(X_1 - X_2) = -F(t)$$

$$M_2(d^2X_2/dt^2) + K(X_2 - X_1) = F(t)$$

$$F(t) = \frac{1}{72} B^2(t) A_a$$

$$B(t) = \frac{1}{NA_a} \int v(t) dt$$

$$v(t) = V_m \sin wt = L(t)\frac{di}{dt} + i(t)\frac{dL(t)}{dt}$$

$$L(t) = 3.19(N^2)(A_i)(10^{-8})/(l_s/\mu_\Delta + l_a(t))$$

$$l_a(t) = 2(X_0 + X_1(t) - X_2(t))$$

Solving these equations yields the following expressions for the mathmetical coefficients $K_1$ and $K_2$:

$$K_1 = (2)(2X_o + l_s/\mu\Delta)(1 + 1/r)$$

and $$K_2 = (2)(2\pi f)(3.19)(N^2)(A_i)(10^{-8})/(1 + 1/r)$$

The following is the nomenclature used in the foregoing equations:

$X_1(t)$: Frame Vibration
$X_2(t)$: Deck Vibration
$X_{2pp}$: Peak to peak amplitude on deck (in.)
$V(t)$: Voltage Across Coil (Equal to line voltage assuming inductance is large)
$i(t)$: Current Through Coil (Amperes)
$X_o$: Initial Air Gap (in.)
$l_a(t)$: Instantaneous Air Gap Movement (in.)
$l_s$: Mean Stator Iron Length (in.)
$\mu_{66}$: Relative Incremental Permeability
r: Weight Ratio or Mass Ratio $M_1/M_2$
f: Line Frequency (Hz) $w = 2wf$
$A_i$: Stator Iron Cross Section (sq. in.)
$A_a$: Air Gap Cross Section (sq. in.)
$B(t)$: Flux Density (lines/sq. in.)
N: Number of Coil Turns
$F(t)$: Magnetic Force (lbs.)
$L(t)$: System Inductance (Henry)
$I_{dc}$: Average Value of Coil Current $i(t)$ (Ampere)
$V_m$: Maximum Value of Line Voltage (Volt)
$K_1, K_2$: Mathematical Coefficients
K: Coupling Spring Constant (lbs./sq. in.)

In order to implement the expression $X_{2pp} = K_1 - K_2 I_{dc}/V_m$, where $I_{dc}$ is the average value of the current $i(t)$ of the coil 12 and $V_m$ is the maximum value of the line voltage across coil 12, the present invention utilizes current conditioning circuit 36 to produce the average coil current $I_{dc}$ and a voltage signal conditioning circuit 38 to produce the maximum line voltage $V_m$.

The current signal conditioning circuit 36 is connected to the resistor 34 which is connected in series between the diode or SCR 32 and one pole of the coil 12. The current $i(t)$ through the resistor 34 is fed through an isolation amplifier 40 and then through a current averaging circuit 42 to generate the average coil current $I_{dc}$. The isolation amplifier 40, which may be an optically coupled linear isolation amplifier model #3650KG manufactured by Burr-Brown Research Corporation of Tuscon, Ariz. 85734, serves to isolate the current signal, which is derived from the resistor 34, from the low voltage control side of the vibratory motor 30.

The voltage signal conditioning circuit 38, which is connected across the coil 12 to receive the voltage v(t), also includes a similar isolation amplifier 44 to isolate the voltage signal v(t) from the low voltage control side of the vibratory motor 30. After isolation, the voltage from the coil terminals is applied to a low pass filter 46 to filter out all frequency components contained in the signal except the line frequency component. A peak detector 48 is utilized to generate the maximum line voltage value $V_m$.

The thus generated $I_{dc}$ and $V_m$ values are then applied to a main divider circuit 50. Circuit 50 includes an analog divider 52, which produces a signal equal to $I_{dc}/V_m$, and a scale factor generator 54. The output from the main divider circuit 50 is a signal equal to $K_2 I_{dc}/V_m$.

The instant invention may also include a $K_1$ computing circuit 56 which is also connected to the current signal conditioning circuit 36 to receive the $I_{dc}$ signal. The $K_1$ computing circuit 56 includes: (1) an incremental permeability computing circuit 58 connected to receive the $I_{dc}$ signal for producing the relative incremental permeability $\mu_\Delta$ of the electromagnetic vibratory motor 30 by solving an empirical equation (2) a second divider circuit 60 for dividing the mean stator iron length $l_s$ by the incremental permeability; and (3) an adder circuit 62 for adding two times the initial air gap $X_o$ to the value of $l_s/\mu_\Delta$ and multiplying that sum by a mass factor equal to $2(1+1/r)$, where r=the ratio of $M_1/M_2$. The result produced by the adder circuit 62 is the coefficient $K_1$.

The outputs from the main divider circuit 50 and the $K_1$ computing circuit 56 are fed to a subtractor 64 which produces the desired vibration signal $X_{2pp}=K_1-K_2I_{dc}/V_m$. Thereafter, this signal ($X_{2pp}$) is connected to a comparison circuit 66 which comprises a set-point value circuit 68 and a comparator amplifier 72. The output of the comparison circuit 66 is connected to a trigger circuit 74 which comprises a synchronous ramp generator 76 and an opto-coupler pulse circuit 78. The output of opto-coupler pulse circuit 78 is connected to gate 80 of SCR 32. The vibration signal $X_{2pp}$ may be optionally connected to an alarm circuit 70 for producing an indication, such as a flashing red light or audible alarm, when the vibration signal bears some predetermined relationship to the set-point value. Alternatively, the alarm circuit 70 may function to turn-off the vibratory motor 30.

Figure 2:
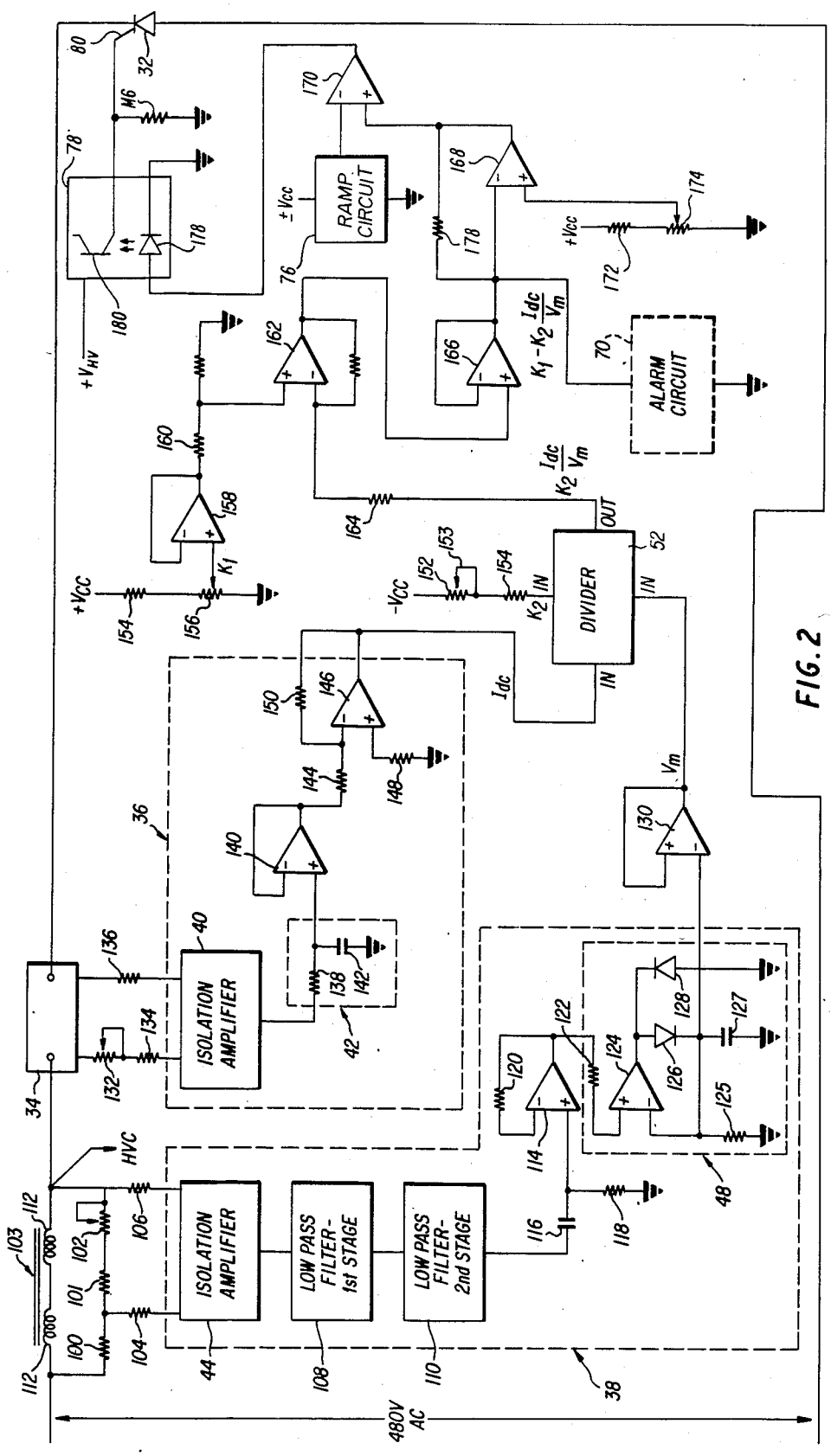
FIG. 2 is a circuit diagram of the present invention.

Referring now to FIG. 2, one pole of the coils 112 is connected to one side of a source of electrical potential, for instance, 480 volts AC. Dropping resistors 100 and 101 and a voltage trim potentiometer 102 are connected together in series across the terminals of the coils 112. The isolation amplifier is connected, via gain resistors 104 and 106 to the series-connected resistors 100, 101, and 102. The output of the isolation amplifier 44 is proportional to the instantaneous voltage across the magnet coils 112 of the vibrator magnet 103 of the vibratory motor 30, and is isolated from the 480-volt high voltage power line.

The output from amplifier 44 is connected to first and second stages of a low pass filter 108 and 110. Each low pass filter stage has a two-pole Butterworth response. The output from the second stage of the low pass filter 110 is the 60 Hz component of the terminal voltage across the vibrator coils 112. Each stage 108 and 110 of the two-stage low pass filter may be a Burr-Brown Universal Active Filter model #UAF41.

The 60 Hz component from the low pass filter stages is fed to an op amp 114 with associated capacitor 116 and resistors 118, 120 and 122 which op amp 114 provides means for adjusting the gain and polarity at this point in the circuitry. The op amp 114 is connected to the positive input of another op amp 124, which, together with its associated resistor, diodes and capacitor 124-128, functions as the peak detector 48. The output of the peak detector 48 is the peak value of the 60 Hz component of the terminal voltage across the vibrator coils 112. The peak value signal is then passed through another op amp 130 which functions as a buffer, the output of which is the desired voltage signal $V_m$.

The current signal $I_{dc}$ is generated by the resistor 34, associated potentiometer 132 and resistors 134 and 136 and the current signal conditioning circuit 36. The resistor 34 may be a low resistance resistor which produces, for instance, a voltage drop thereacross on the order of about 100 millivolts. The resistor 34 is connected between one pole of the coils 112 and the cathode of the diode or SCR 32. The current conditioning circuit 36 is connected across the resistor 34 by means of a series combination of potentiometer 132 and resistors 134, 136. The purpose of these resistance elements is to trim the input current to the isolation amplifier 40.

The output of the isolation amplifier 40 is fed through resistor 138 to the positive terminal of an op amp 140. This terminal of the op amp 140 is also connected to ground through a capacitor 142. The resistor 138 and capacitor 142 function as the current averaging circuit 42 and are unloaded by the op amp 140. The output of the op amp 140, in addition to being fed back to its negative input, is connected through a resistor 144 to the negative input of another op amp 146. The positive input of this op amp 146 is connected to ground by a resistor 148. The output of op amp 146 is fed back to its negative input by means of resistor 150. Op amp 146 produces at its output the desired current signal $I_{dc}$. It also provides means for adjusting the gain and polarity at this point in the circuitry.

The outputs of op amps 130 and 146, the desired $V_m$ and $I_{dc}$ signals, respectively, are fed to two inputs of an analog divider 52. This element may be an integrated circuit analog divider model #AD535JH, available from Analog Devices, Inc., Norwood, Mass. 02062. A potentiometer 152 is connected at one pole to the negative terminal of the low voltage side of the direct current power supply. The other pole of the potentiometer 152 is connected through a resistor 154 to a third input of the divider 52. The potentiometer 152 provides the coefficient $K_2$ as a scale factor adjustment by adjusting its wiper 153. This potentiometer allows the adjustment of the coefficient $K_2$ to a value useful with the divider 52. The output of the divider is the signal representing $K_2 I_{dc}/V_m$.

The coefficient $K_1$ is optionally generated by a potentiometer 156. Resistor 154 is connected to the positive side of the low voltage direct current power supply. One pole of the potentiometer 156 is connected to the other side of the resistor 154, while the other pole thereof is connected to ground. The coefficient $K_1$ appears on the wiper of the potentiometer 156. This wiper is connected to the positive input of the op amp 158 the output of which is connected to both its negative input and, through a resistor 160, to the positive input of an op amp 162. The op amp 162 functions as a subtractor. Thus, a signal representing $K_2 I_{dc}/V_m$ is fed through a resistor 164 to the negative input of op amp 162. Since the signal representing $K_1$ is fed to the positive input of the op amp 162, the op amp produces the signal $K_1-K_2\ I_{dc}/V_m$ at its output.

The output of the op amp 162 is connected to the positive terminal of an op amp 166, which operates as a buffer, as does op amp 158. Thus, the buffered $K_1-K_2\ I_{dc}/V_m$ signal is available at the output of the op amp 166. Op amp 166 as well as all of the other op amps in the circuit shown in FIG. 2 may be a general purpose operational amplifier, such as an op amp 741.

The set point circuit 68 comprises a resistor 172 and a potentiometer 174. The wiper of the potentiometer 174 and the signal $K_1-K_2\ I_{dc}/V_m$ are connected to an op amp 168, which, with resistor 178, is used as a comparator amplifier 72.

The synchronous ramp generator 76 may comprise a RCA chip #CA3904A, as described in RCA Application Note #ICAN6048. The output of the ramp generator and the output of the op amp 168 are connected to an op amp 170, which is used to pinpoint the timing of the trigger circuit 74. The output of op amp 170 is connected to a light emitting diode 178, which emits light when energized by op amp 170. The emitted light crosses over from low voltage side to high voltage side and causes a photo-transistor 180 to conduct. The photo-transistor 180, when conducting, delivers gating pulses through resistor 176 to gate 80 of SCR 32. The opto-coupler may be a G.E. #H11G1.

The signal $K_1-K_2\ I_{dc}/V_m$ may optionally be connected to an alarm circuit 70 for the purposes described in connection with FIG. 1. As also discussed in connection with FIG. 1, a diode or SCR 32 is connected between one side of the 480 v power source and one side of the resistor 34.

From the foregoing description, it will be understood by those skilled in the art that the present invention provides a method of and apparatus for monitoring the vibration amplitude of an electromagnetic vibratory motor by monitoring the voltage and current induced in the motor and producing a control signal therefrom.

Although only a preferred embodiment is specifically illustrated and described herein, it will be appreciated that many modifications and variations of the present invention are possible in light of the above teachings and within the purview of the appended claims without departing from the spirit and intended scope of the invention.

What I claim is:

1. Apparatus for controlling the vibration amplitude of an electromagnetic vibratory motor, said motor comprising an electromagnet having at least one coil adapted to be connected to a source of high voltage electrical energy, comprising:
    means for sensing the current induced in said coil during operation of said vibratory motor;
    means for sensing the voltage induced in said coil during operation of said vibratory motor;
    means receiving said sensed induced voltage and current for producing an output signal representative of the vibration amplitude of said vibratory motor; and
    means receiving said output signal for controlling the operation of said vibratory motor.

2. The apparatus of claim 1, wherein said means for receiving said sensed induced voltage comprises voltage signal conditioning means for producing an output signal representative of the peak value of the 60 Hz component of the voltage across said electromagnetic vibratory motor and said means for receiving said induced current comprises current signal conditioning means for producing an output signal representative of the average current through said electromagnetic vibratory motor.

3. The apparatus of claim 2, wherein said voltage signal conditioning means comprises:
    isolation amplifier means for isolating said sensed induced voltage from said source of high voltage electrical energy;
    low pass filter means for obtaining the 60 Hz component contained in said sensed induced voltage; and
    peak detector means for producing an output signal representative of the peak value of the 60 Hz component of the voltage across said electromagnetic vibratory motor.

4. The apparatus of claim 2, wherein said current conditioning means comprises:
    isolation amplifier means for isolating said sensed induced current from said source of high voltage electrical energy; and
    current averaging means for producing an output signal representative of the average current through said electromagnetic vibratory motor.

5. The apparatus of claim 2, wherein said means for producing an output signal representative of the vibration amplitude of said vibratory motor comprises divider means connected to said voltage and current signal conditioning means for producing a signal proportional to the average current through said vibratory motor divided by the peak value of the 60 Hz component of the voltage across said vibratory motor.

6. The apparatus of claim 5, wherein said divider means comprises:
    analog divider means connected to receive said signal representative of the average current through said vibratory motor and a signal representative of the peak value of the 60 Hz component of the voltage across said vibratory motor for producing a signal representative of the average current divided by the peak value of the 60 Hz voltage component; and
    first scale factor generating means for multiplying the average current divided by the peak value of the 60 Hz voltage component signal by a predetermined factor to produce a scaled current/voltage signal.

7. The apparatus of claim 5, wherein said means for producing an output signal representative of the vibration amplitude of said vibratory motor further comprises second scale factor generating means for producing a second predetermined scale factor signal.

8. The apparatus of claim 7, wherein said means for producing an output signal representative of the vibration amplitude of said vibratory motor further comprises subtracting means connected to receive said first predetermined scale factor signal and said scaled current/voltage signal for subtracting said scaled current/voltage from said first predetermined scale factor signal for producing said output signal representative of the vibration amplitude of said vibratory motor.

9. The apparatus of claim 1, wherein said signal producing means includes means for dividing the induced current by the induced voltage to produce a divided signal and subtracting means connected to receive said divided signal for subtracting the equivalent air gap lengths from said divided signal.

10. Apparatus for controlling the vibration amplitude of an electromagnetic vibratory motor, said motor comprising an electromagnet having at least one coil adapted to be connected to a source of electrical energy comprising:
- means for rectifying the induced current drawn by said coil;
- means for sensing said rectified current and the voltage drawn by said coil;
- divider means, connected to said sensing means, for dividing said induced current by said induced voltage to obtain a divided signal;
- computing means connected to receive said induced current to produce a first predetermined scaling signal $K_1$;
- scaling means connected to said divider means for multiplying said divided signal by a second predetermined scaling factor $K_2$ to obtain a scaled signal $K_2 I/V$;
- subtracting means connected to both said computing means and said scaling means for subtracting said scaled signal $K_2 I/V$ from the first scaling signal $K_1$ to obtain an output signal proportional to the vibration amplitude of said motor; and
- means for receiving said output signal for controlling said motor.

11. The apparatus of claim 10, wherein:

$$K_1 = (2)(2X_o + l_s/\mu_\Delta)/(1 + 1/r);$$

and $$K_2 (2)(2\pi f)(3.19)(N^2)(A_i)(10^{-8})/(1 + 1/r)$$

where:
- $X_o$ = the initial air gap of said coil
- $l_s$ = mean iron length of said electromagnet
- $\mu_\Delta$ = *relative incremental permeability*
- r = weight ratio
- f = the line frequency of the energy source
- N = number of coil turns
- $A_i$ = stator iron cross section of said electromagnet.

12. A method for determining the vibration amplitude of an electromagnetic vibratory motor, said motor comprising an electromagnet having at least one coil adapted to be connected to a source of electrical energy, comprising the steps of:
- sensing the current induced in said coil during operation of said vibratory motor;
- sensing the voltage induced in said coil during operation of said vibratory motor;
- dividing said sensed current by said sensed voltage to produce a divided signal;
- generating first and second predetermined scale factors;
- multiplying said divided signal by said second scale factor to produce a scaled divided signal; and
- subtracting said scaled divided signal from said first scale factor.

* * * * *